United States Patent
Ontiveros (10) Patent No.: US 11,309,700 B2
(45) Date of Patent: Apr. 19, 2022

(54) COMMUNICATION CONTROLLER SHORT PROTECTION

(71) Applicant: TEXAS INSTRUMENTS INCORPORATED, Dallas, TX (US)

(72) Inventor: Jacob Henry Ontiveros, Garland, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 225 days.

(21) Appl. No.: 16/361,086

(22) Filed: Mar. 21, 2019

(65) Prior Publication Data

US 2020/0303916 A1 Sep. 24, 2020

(51) Int. Cl.
*H02H 3/16* (2006.01)
*H01R 13/66* (2006.01)
*H02H 1/00* (2006.01)
*G06F 13/38* (2006.01)

(52) U.S. Cl.
CPC ............ *H02H 3/16* (2013.01); *G06F 13/385* (2013.01); *H01R 13/665* (2013.01); *H02H 1/0007* (2013.01)

(58) Field of Classification Search
CPC .............. G06F 13/385; G06F 13/4282; G06F 2213/0042; H02H 3/16; H02H 1/0007; H01R 13/665–6691
See application file for complete search history.

(56) References Cited

U.S. PATENT DOCUMENTS

| | | | |
|---|---|---|---|
| 4,453,215 A | 6/1984 | Reid | |
| 5,497,284 A | 3/1996 | Suu | |
| 2020/0004309 A1* | 1/2020 | Moritomo | G06F 1/28 |
| 2020/0153256 A1* | 5/2020 | Park | H02J 7/0036 |

FOREIGN PATENT DOCUMENTS

| | | |
|---|---|---|
| CN | 203690882 U | 7/2014 |
| WO | 2001048994 A1 | 7/2001 |

OTHER PUBLICATIONS

JP 2018-126358. Jul. 2, 2018. (Year: 2018).*

(Continued)

*Primary Examiner* — Jared Fureman
*Assistant Examiner* — Christopher J Clark
(74) *Attorney, Agent, or Firm* — Valerie M. Davis; Charles A. Brill; Frank D. Cimino (57) ABSTRACT

Aspects of the disclosure provide for a circuit. In some examples, the circuit includes a first current source having a terminal coupled to a first node and a second terminal, a first switch coupled between the second terminal of the first current source and a second node, a first resistor coupled between the second node and a ground terminal, a second current source having a terminal coupled to the first node and a second terminal, a second switch coupled between the second terminal of the second current source and a third node, a second resistor coupled between the third node and the ground terminal, a third current source having a terminal coupled to the first node and a second terminal, a third switch coupled between the second terminal of the third current source and a fourth node, and a third resistor coupled between the fourth node and the ground terminal.

20 Claims, 6 Drawing Sheets

(56) References Cited

OTHER PUBLICATIONS

"USB Power Delivery Specification Revision 3.0, Version 1.2," Copyright 2010-2018, USB 3.0 Promoter Group: Apple Inc., Hewlett-Packard Inc., Intel Corporation, Microsoft Corporation, Renesas, STMicroelectronics, and Texas Instruments, 614 p.

"Universal Serial Bus Type-C Cable and Connector Specification," Release 1.3, Jul. 14, 2017, Copyright 2014-2017, USB 3.0 Promoter Group: Apple Inc., Hewlett-Packard Inc., Intel Corporation, Microsoft Corporation, Renesas, STMicroelectronics, and Texas Instruments, 247 p.

PCT Search Report dated Jul. 2, 2020.

\* cited by examiner

COMMUNICATION CONTROLLER SHORT PROTECTION

BACKGROUND

Universal Serial Bus (USB) communications occur between a Host having a downstream facing port (DFP) and a Device having an upstream facing port (UFP). The DFP and the UFP are sometimes implemented by a single port referred to as a dual role port (DRP) that is controllable to operate as either a DFP or a UFP. In some USB technologies, such as USB Type-C (USB-C), an orientation of insertion of a plug (sometimes referred to as a connector) into a receptacle (sometimes referred to as a port) is reversible and pins, pads, or other conductive elements of both the plug and the receptacle have a small pitch (e.g., the distance from the center point of one pin, pad, or other conductive element to the center point of an immediately adjacent pin, pad, or other conductive element).

SUMMARY

Aspects of the present disclosure provide for a circuit. In some examples, the circuit includes a first current source, a first switch, a first resistor, a second current source, a second switch, a second resistor, a third current source, a third switch, and a third resistor. The first current source has a first terminal coupled to a first node and a second terminal. The first switch is coupled between the second terminal of the first current source and a second node. The first resistor is coupled between the second node and a ground terminal. The second current source has a first terminal coupled to the first node and a second terminal. The second switch is coupled between the second terminal of the second current source and a third node. The second resistor is coupled between the third node and the ground terminal. The third current source has a first terminal coupled to the first node and a second terminal. The third switch is coupled between the second terminal of the third current source and a fourth node. The third resistor is coupled between the fourth node and the ground terminal.

Other aspects of the present disclosure provide for a circuit. In an example, the circuit includes a configuration channel (CC) terminal short circuit protection circuit, a bus voltage (VBUS) terminal short circuit protection circuit, and a processing element. The CC terminal short circuit protection circuit is configured to close a first switch to apply a first constant current to a CC1 terminal coupled to a ground terminal via a first resistor to determine an amount of resistance present at the CC1 terminal, close a second switch to apply a second constant current to a CC2 terminal coupled to the ground terminal via a second resistor to determine an amount of resistance present at the CC2 terminal, and open the first switch and the second switch. The VBUS terminal short circuit protection circuit is configured to close a third switch to apply a third constant current to VBUS terminal coupled to the ground terminal via a third resistor to determine an amount of resistance present at the VBUS terminal and open the third switch. The processing element is configured to control the first switch, the second switch, and the third switch to close after determining that a plug has been inserted into a receptacle that includes the CC1 terminal, the CC2 terminal, and the VBUS terminal, measure a voltage present at the CC1 terminal to determine the amount of resistance present at the CC1 terminal, measure a voltage present at the CC2 terminal to determine the amount of resistance present at the CC2 terminal, measure a voltage present at the VBUS terminal to determine the amount of resistance present at the VBUS terminal, control the first switch, the second switch, and the third switch to open, and prevent application of a VBUS signal to the VBUS terminal when the determined amount of resistance present at the CC1 terminal and the determined amount of resistance present at the CC2 terminal, or the determined amount of resistance present at the VBUS terminal indicates that a short circuit condition exists.

Other aspects of the present disclosure provide for a system. In some examples, the system includes a processor, a processor, a communication port, and a communication controller. The communication port has a first configuration channel (CC1) terminal, a second configuration channel (CC2) terminal, and a VBUS terminal. The communication controller is configured to facilitate communication by the processor via the communication port. The communication controller includes a first current source, a first switch, a first resistor, a second current source, a second switch, a second resistor, a third current source, a third switch, a third resistor, and a processing element. The first current source has a first terminal coupled to a first node and a second terminal. The first switch is coupled between the second terminal of the first current source and the CC1 terminal. The first resistor is coupled between the CC1 terminal and a ground terminal. The second current source has a first terminal coupled to the first node and a second terminal. The second switch is coupled between the second terminal of the second current source and the CC2 terminal. The second resistor us coupled between the CC2 terminal and the ground terminal. The third current source has a first terminal coupled to the first node and a second terminal. The third switch is coupled between the second terminal of the third current source and the VBUS terminal. The third resistor is coupled between the VBUS terminal and the ground terminal. The processing element is coupled to and configured to control the first switch, the second switch, and the third switch.

BRIEF DESCRIPTION OF THE DRAWINGS

For a detailed description of various examples, reference will now be made to the accompanying drawings in which.

DETAILED DESCRIPTION

As pitch decreases in a USB port and/or receptacle, the opportunity for, and probability of, a short occurring between one or more adjacent pins, pads, or other conductive elements increases. The short can, in various examples, cause unintended or undesirable operation of a device, damage the device, or destroy the device. While some implementations of USB communication systems include external short protection (e.g., external to the USB communication system), the short protection is most commonly implemented after a USB Power Delivery (PD) controller and before other circuitry of the device. Accordingly, the short can still cause damage to a USB cable, a USB plug, a USB receptacle, or the USB PD controller, despite the external short protection.

At least some aspects of the present disclosure provide for short circuit protection in a USB communication system. The short circuit protection, in some examples is applied to a VBUS terminal of the USB communication system, a configuration channel (CC)1 terminal of the USB communication system, and/or a configuration channel (CC)2 terminal of the USB communication system. In other examples the short circuit protection is applied to any one or more other terminals of the USB communication system. Additionally, while discussed herein in the context of a USB communication system, the various examples of the present disclosure are equally applicable to other communication systems having plugs and/or receptacles that may be susceptible to short circuit conditions.

In at least one example, the short circuit protection of the present disclosure includes selectively applying a known amount of current to the VBUS terminal, the CC1 terminal, and/or the CC2 terminal and measuring a resulting voltage present at the respective terminal. Based on the known amount of current and the measured voltage, a resistance can be determined. Based on the determined resistance and/or the measured voltage, it can be determined whether a short circuit condition exists between terminals of the receptacle, plug, or other device. For example, when the measured voltage is approximately equal to a predefined value and/or the determined resistance is less, equal to, or greater than any one or more predefined values, it may be determined that the short circuit condition exists at a terminal at which the voltage was measured. The measuring and determination are, in some examples, performed by a USB PD controller, while in other examples the measuring and/or the determination are performed by another processing device coupled to the USB PD controller. In at least some examples, the determination of the existence of the short circuit condition is performed prior to establishing USB communication between a host and a device, for example, providing of a bus voltage (VBUS) from the host to the device to power the device. Determining the existence of the short circuit condition prior to establishing the USB communication between the host and the device, in various examples, protects the host and the device from unintended operations, damage, and/or destruction of the host or the device resulting at least partially from the existence of the short circuit condition when USB communication is commenced (e.g., such as resulting from a short circuit condition existing when a voltage is applied to the VBUS terminal).

Figure 1:
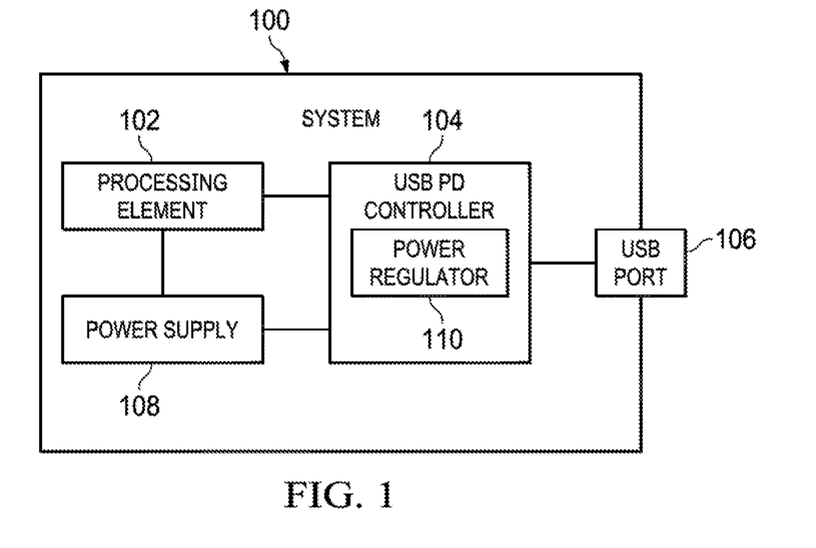
FIG. 1 shows a block diagram of an illustrative system in accordance with various examples.

Referring now to FIG. 1, a block diagram of an illustrative system 100 is shown. The system 100 is representative of a computing or other electrical device having USB communication and/or charging capabilities. Generally, the system 100 is representative of any device that includes a USB PD controller to manage the flow of power and/or data through a USB receptacle or plug. In at least one example, the system 100 includes a processing element 102, a USB PD controller 104, a USB port 106, and a power supply 108. The processing element 102 is any suitable electrical component or device capable of performing processing functions. For example, the processing element 102 may be a processor, a microprocessor, a field-programmable gate array (FPGA), a logic structure, and/or any other component or components that perform processing functionality for the system 100. The USB PD controller 104 is a USB PD controller having at least the short circuit protection functionality taught herein and is coupled to the processing element 102 and configured to manage communication via the USB port 106. For example, the USB PD controller 104 is configured to determine whether the USB port 106 is operating as a DFP or a UFP and control providing of power to a VBUS terminal of the USB port 106 from the power supply 108 and/or providing of power from a power regulator 110 (e.g., a low-dropout regulator, switch-more power regulator, etc.), implemented at least partially within the USB PD controller 104, to the VBUS terminal of the USB port 106. In at least some examples, the processing element 102 and the USB PD controller 104 are incorporated into a single circuit board, such as a motherboard or mainboard of an electronic device. The power supply 108, in at least some examples, is coupled to the processing element 102 and the USB PD controller 104 and configured to provide power to the processing element and the USB PD controller 104, as well as the USB port 106 (e.g., at a VBUS terminal of the USB port 106) subject to the control of the USB PD controller 104. In at least some examples, although not shown, the power supply 108 includes a plurality of outputs (e.g., where different outputs have different output voltage values and or capacity for sourcing current) and/or one or more power regulation components (e.g., such as low-dropout regulators) (not shown) are coupled between an output of the power supply 108 and the processing element 102, the USB PD controller 104, and/or the USB port 106 to modify a value of the output of the power supply 108 prior to receipt of the signal by the processing element 102, the USB PD controller 104, and/or the USB port 106. In at least some examples, the USB PD controller 104 advantageous enables the processing element 102 to communicate according to USB protocols with another device (not shown) coupled to the USB port 106, facilitating interoperability between devices. The USB PD controller 104 further advantageously protects the processing element 102, power supply 108, and/or the another device coupled to the USB port 106 from damage or degradation in performance resulting from a short circuit occurring at the USB port 106.

Figure 2:
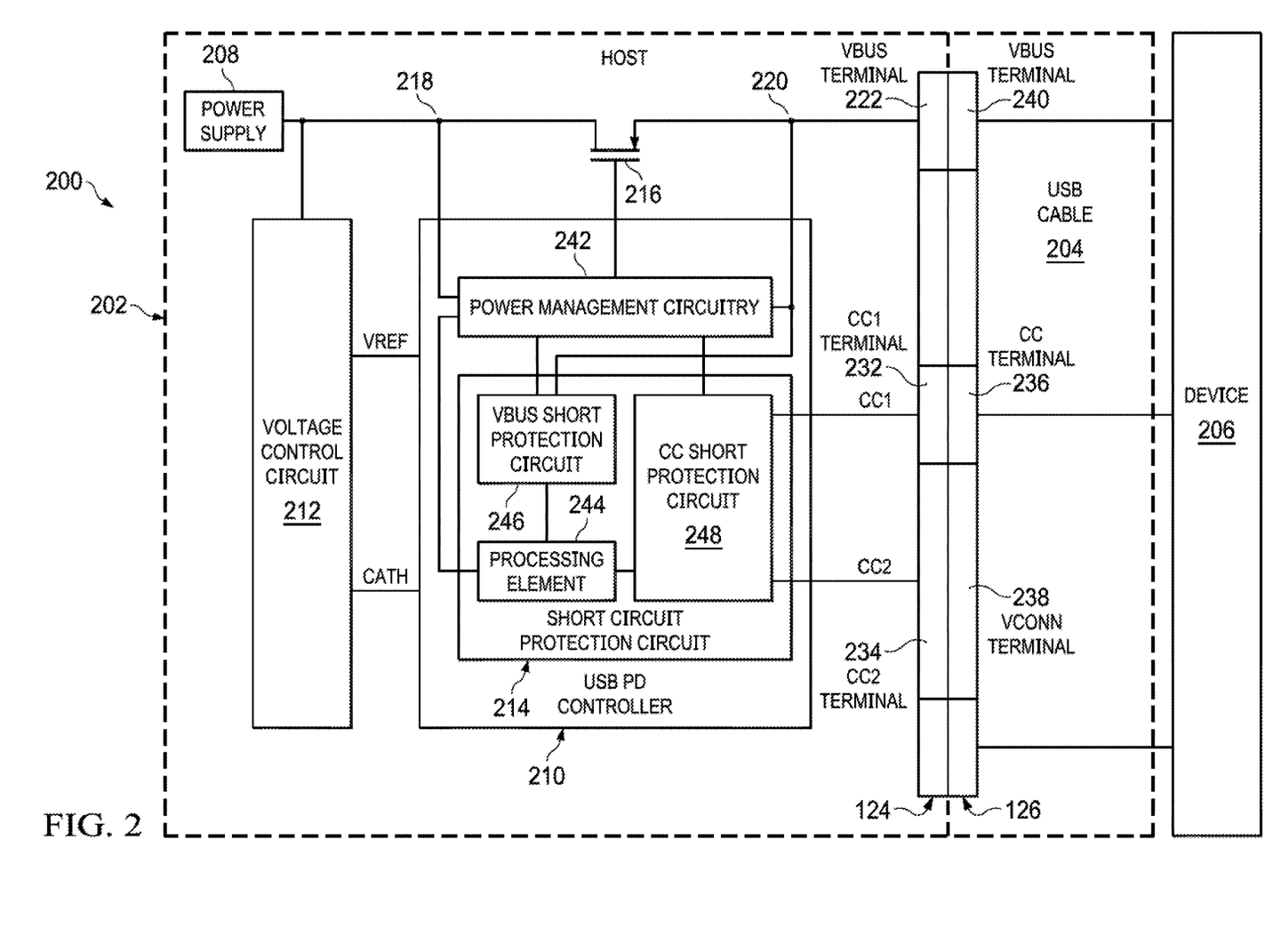
FIG. 2 shows a schematic diagram of an illustrative USB system in accordance with various examples.

Referring now to FIG. 2, a block diagram of a USB system 200 is shown. In one example, the USB system includes a host 202, a USB cable 204, and a device 206. The host 202, in at least one example, provides a signal to the device 206 via the USB cable 204 such that the device 206 pulls current from the host 202 via the USB cable 204. In at least some examples, the host 202 includes a power supply 208, a USB PD controller 210, and a voltage control circuit 212. The power supply 208 is a power supply capable of providing an output signal that, in some examples, has an adjustable voltage level that is adjusted, for example, based on a control signal received by the power supply 208. In at least some examples, the power supply 208 receives the control signal from the voltage control circuit 212 (e.g., via optical communication such as via an optocoupler, or via receipt of an analog or digital signal from any suitable source or coupling (not shown)), while in other examples the power supply 208 receives the control signal from the voltage control circuit 212 via a physical coupling between the power supply 208 and the voltage control circuit 212. In other examples, the power supply 208 itself is not adjustable, but an external component coupled, or configured to couple, to an output of the power supply 208 adjusts a value of a signal output by the power supply 208. For example, the power supply output may be a signal having a substantially constant voltage value that is manipulated to output one or more other signals having different voltage values than the power supply output. For example, the power supply output may be manipulated by a power converter (not shown), such as a buck converter, a boost converter, or a buck-boost converter, and an output of the power converter may be provided to the node 218. In at least some examples, the power converter 208 is controlled by the voltage control circuit 212 to manipulate the power supply output to form the one or more other signals. The USB PD controller 210, in at least one example, is, or includes, a microcontroller having processing capabilities. In other examples, the USB PD controller 210 is, or includes, any processing element capable of receiving one or more inputs and generating one or more outputs based on rules, analysis, or other processing applied to at least some of the inputs.

The voltage control circuit 212 is any circuit capable of regulating and/or controlling a value of the signal that is present at node 218. For example, the voltage control circuit 212 is any circuit capable of receiving a reference voltage (VREF) from the USB PD controller 210 and controlling power supply 208 according to VREF to control the value of the signal present at node 218. For example, the voltage control circuit 212 controls the power supply 208 according to VREF to cause the signal present at node 218 to have a value approximately equal, proportional, or otherwise having a relationship to a value of VREF, a scope of which is not limited herein.

The USB PD controller 210, in at least some examples, includes and/or implements at least a portion of a short circuit protection circuit 214. For example, when the USB PD controller 210 is a microcontroller, at least a portion of the short circuit protection circuit 214 is implemented as particular programming within the USB PD controller 210 to perform at least some of the operations disclosed herein. In other examples, the short circuit protection circuit 214 is implemented separately from the USB PD controller 210 (e.g., as a separate microcontroller or other processing element) and configured to couple to the USB PD controller 210. In some examples, the host 202 further includes a transistor 216 operable as a switch to control output of the VBUS signal via a VBUS terminal 222 of receptacle 224 of the host 202. The transistor 216 may be of any suitable technology, including at least p-type field effect transistor (FET) or n-type FET. In yet other examples, the transistor 216 may be representative of a back-to-back pair of transistors (e.g., having their drain terminals coupled together or having their source terminals coupled together), such as back-to-back p-type FETs or back-to-back n-type FETs such that a body diode of each of the back-to-back pair of transistors provides signal blocking in one direction. Additionally, while the transistor 216 is illustrated in FIG. 1 as being a separate component that is coupled to the USB PD controller 210, in at least some examples the transistor 216 is integrated with the USB PD controller 210, such as on a same chip, in a same package, etc.

In at least one example architecture, an output of the power supply 208 is coupled to a node 218, an input of the voltage control circuit 212 is coupled to the node 218, a first terminal of the USB PD controller 210 is coupled, or configured to couple, to the node 218, and a first terminal (e.g., a drain terminal) of the transistor 216 is coupled to the node 218. A first input of the voltage control circuit 212 is coupled to a VREF output of the USB PD controller 210, and a first output of the voltage control circuit 212 is coupled to a CATH input of the USB PD controller 210. A first terminal of the USB PD controller 210 is coupled to a gate terminal of the transistor 216, a second terminal of the USB PD controller 210 is coupled to node 220, a second terminal (e.g., a source terminal) of the transistor 216 is coupled to node 220, and the VBUS terminal 222 is coupled to node 220. A second terminal of the circuit 214 is configured to couple to a configuration channel (CC)2 terminal 232 and a third terminal of the circuit 214 is configured to couple to a CC2 terminal 234. In various examples, CC1 and CC2 are each configurable to couple to a VCONN terminal 238 of the USB cable 204 or a CC terminal 236 of the USB cable 204, depending on the orientation in which the plug 226 is inserted into the receptacle 224. In at least some examples, a fourth terminal of the short circuit protection circuit 214 is further coupled to the node 220. In some examples, the VBUS terminal 222, the CC1 terminal 232, and the CC2 terminal 234 are housed in, are a part of, or otherwise interact with the receptacle 224 to communicatively couple the host 202 to the USB cable 204 via the plug 226.

In at least one example, the USB cable 204 includes a plug 126 configured to interact with the receptacle 124 to communicatively couple the USB cable 204 to the host 202. The plug 126 houses, includes, or otherwise interacts with a VBUS terminal 240, the CC terminal 236, and the VCONN terminal 238 each configured to communicatively couple the USB cable 204 to the host 202. In various examples, the USB cable 204 includes other components (not shown) such as a paddle card, e-marker, or other circuitry or components. The device 206 may be any device suitable for coupling to the USB cable 204 to receive power from the host 202 and/or communicate data with the host 202 and the scope of the device 206, its hardware architecture, or its method of operation are not limited herein. In at least some examples, the device 206 also implements a USB controller substantially similar to the USB PD controller 210 and/or includes functionality substantially similar to the short circuit protection circuit 214.

In at least some examples, the USB PD controller 210 further includes power management circuitry 242 configured to control the transistor 216 and generate one or more voltage signals for use within the USB PD controller 210 or output by the USB PD controller 210. For example, the power management circuitry 242 includes one or more voltage regulators (not shown), transistors (not shown), or other circuitry configured to generate, output, and/or control output of one or more signals based on a signal present at the node 218 and having a value scaled from a value of the signal present at the node 218. In some examples, the USB PD controller 210 further includes a processing element 244. The processing element 244, in some examples, is any digital and/or analog circuitry that includes processing or decision making functionality. For example, based on one or more received signals, the processing element 244 controls the power management circuitry 242, the short circuit protection circuit 214, and/or any one or more other components or circuits of the USB PD controller 210.

In at least some examples, the short circuit protection circuit 214 includes a VBUS short protection circuit 246 and a CC short protection circuit 248. The VBUS short protection circuit 246, in at least some examples, sources current through a resistor (not shown) coupled to the node 220 to determine whether a short circuit condition exists at the node 220 (and correspondingly the VBUS terminal 222). Similarly, the CC short protection circuit 248, in at least some examples, sources current through a resistor (not shown)

coupled to the CC1 terminal 232 and a resistor (not shown) coupled to the CC2 terminal 234 to determine whether a short circuit condition exists at the CC1 terminal 232 and the CC2 terminal 234, respectively. In at least some examples, the short circuit condition exists at node 220 when a voltage measured at the node 220 is about 1.1 volts (V), a determined resistance is 5.1 kiloohms, plus or minus twenty percent variation, or the determined resistance is in a range of about 800 ohms to about 1.2 kiloohms. In some examples, the short circuit condition exists at the CC1 terminal 232 and the CC2 terminal 234 when the determined resistance at both the CC1 terminal 232 and the CC2 terminal 234 is less than about 500 ohms. The resistance is determined, in at least some examples, by the processing element 244 based on a measurement of a voltage present at the respective nodes or terminals being measured. For example, the measurement of the voltage present at the respective nodes or terminals being measured is converted by an analog-to-digital converter (ADC) (not shown) of the processing element 244 from an analog value to a digital value and the processing element 244 divides the digital value by a value of the current sourced through the respective nodes or terminals being measured to determine the resistance present at the respective nodes or terminals being measured. When the short circuit condition exists at node 220 or the CC1 terminal 232 and the CC2 terminal 234, in some examples, the processing element 244 outputs a signal to cause generation by the system 200, or a device including the system 200, of a user notification to notify a user of the short circuit condition. Additionally, when the short circuit condition exists at node 220 or the CC1 terminal 232 and the CC2 terminal 234, in at least some examples, the processing element 244 prevents the USB PD controller 210 from coupling the node 218 to the node 220 through the transistor 216, protecting the USB PD controller 210 and/or other components of the system 200, or a device including the system 200, from damage resulting from the short circuit condition.

While discussed herein and illustrated in FIG. 2 as the CC1 terminal 232 being configured to couple to the CC terminal 236 and the CC2 terminal 234 being configured to couple to the VCONN terminal 238, in some examples the couplings may be reversed. For example, at least some USB cables 204 may be reversible such that, depending on an orientation with which the plug 226 is inserted into the receptacle 224, the CC1 terminal 232 is configured to couple to one of the CC terminal 236 or the VCONN terminal 238 and the CC2 terminal 234 is configured to couple to the other of the CC terminal 236 or the VCONN terminal 238. Thus, while couplings associated with one orientation of insertion of the plug 226 into the receptacle 224 are described herein, couplings associated with any orientation of insertion of the plug 226 into the receptacle 224 are contemplated herein and encompassed within the scope of the present disclosure. Accordingly, in at least some examples, the USB PD controller 210 is further configured to detect and/or determine which of CC1 terminal 232 or CC2 terminal 234 is coupled to the VCONN terminal 238 (or to the CC terminal 236) to determine which of CC1 terminal 232 or CC2 terminal 234 to couple to node 218.

Figure 3:
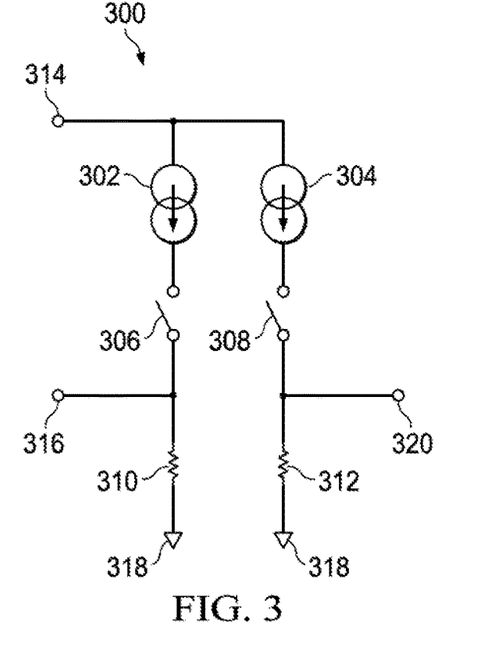
FIG. 3 shows a schematic diagram of an illustrative circuit in accordance with various examples.

Referring now to FIG. 3, a schematic diagram of an illustrative circuit 300 is shown. In at least some examples, the circuit 300 is suitable for implementation as the CC short protection circuit 248 of the USB PD controller 210 of FIG. 2 and reference is made to elements of FIG. 2 in describing the circuit 300. In at least some examples, the circuit includes a first current source 302, a second current source 304, a switch 306, a switch 308, a resistor 310, and a resistor 312. In at least some examples, the resistor 306 has a resistance of about 500 ohms and the resistor 308 has a resistance of about 500 ohms. In at least some examples, a first terminal of the first current source 302 is coupled to a first node 314, a second terminal of the first current source 302 is coupled to a first terminal of the switch 306, and a second terminal of the switch 306 is coupled to a second node 316. The resistor 310 is coupled between the second node 316 and a ground terminal 318. A first terminal of the second current source 304 is coupled to the first node 314, a second terminal of the second current source 304 is coupled to a first terminal of the switch 308, and a second terminal of the switch 308 is coupled to the a third node 320. The resistor 312 is coupled between the third node 320 and the ground terminal 318. In at least some examples, the first node 314 is configured to couple to a voltage supply, such as an output of the power management circuitry 242, the second node 316 is coupled to the CC1 terminal 232, and the third node 320 is coupled to the CC2 terminal 234.

The switch 306 and the switch 308, in at least some examples, are controlled by the processing element 244 of the USB PD controller 210. For example, when the processing element 244 detects that the plug 226 has been inserted into the receptacle 224 and/or when the receptacle 224 is operating in a DFP mode, prior to controlling the transistor 216 to couple the node 218 to the node 220, the processing element 244 controls the switch 306 and the switch 308 to close. When the switch 306 is closed, the current source 302 is coupled to the second node 316 and current flows through the resistor 310 to the ground terminal 318, creating a voltage under non-short circuit conditions at the second node 316 approximately equal to the output of the current source 302 divided by a resistance of the resistor 310. When the switch 308 is closed, the current source 304 is coupled to the third node 320 current flows through the resistor 312 to the ground terminal 318, creating a voltage at the third node 320 approximately equal to the output of the current source 304 divided by a resistance of the resistor 312.

In at least some examples, the second node 316 and the third node 320 are monitored by the processing element 244 to determine the voltages present at the second node 316 and the third node 320, respectively, thereby determining the resistance of the resistor 310 and the resistance of the resistor 312. For example, an ADC of the processing element 244 has inputs coupled to the second node 316 and the third node 320 and a digital value representative of the output of the current source 302 and the current source 304, respectively, is divided by an output of the ADC. When the resistance determined according to the voltage measured at the second node 316 is less than about 500 ohms, the processing element 244 determines that a short circuit condition exists with the CC1 terminal 232. When the resistance determined according to the voltage measured at the third node 320 is less than about 500 ohms, the processing element 244 determines that a short circuit condition exists with the CC2 terminal 234. When a short circuit condition exists, the USB PD controller 210 prevents coupling of the node 218 to the node 220, protecting the USB PD controller 210 from the determined short circuit condition. In at least some examples, after determining the resistance of the resistor 310 and the resistor 312, the switch 306 and the switch 308 are controlled to open, decoupling the current source 302 from the second node 316 and the current source 304 from the third node 320, respectively.

Figure 4:
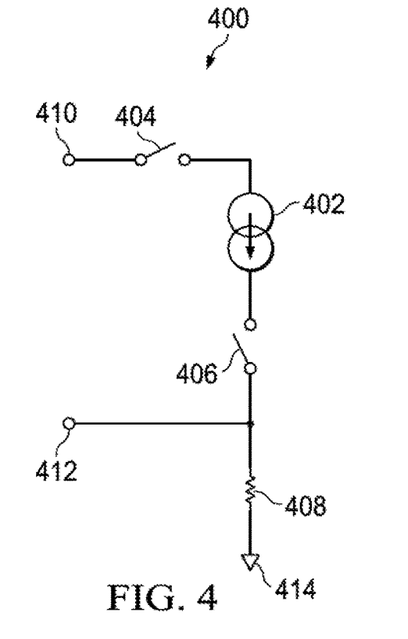
FIG. 4 shows a schematic diagram of an illustrative circuit in accordance with various examples.

Referring now to FIG. 4, a schematic diagram of an illustrative circuit 400 is shown. In at least some examples, the circuit 400 is suitable for implementation as the VBUS short protection circuit 246 of the USB PD controller 210 of FIG. 2 and reference is made to elements of FIG. 2 in describing the circuit 400. In at least some examples, the circuit includes a current source 402, a switch 404, and a switch 406. In at least some examples, a first terminal of the switch 404 is coupled to a first node 410, a second terminal of the switch 404 is coupled to a first terminal of the current source 402, a second terminal of the current source 402 is coupled to a first terminal of the switch 406, and a second terminal of the switch 406 is coupled to a second node 412. In at least some examples, the resistor 408 is not a physical and/or discreet component, but is instead representative of an amount of resistance that will be present to the circuit 400 when a short is present at the second node 412. When the short is present at the second node 412, an amount of resistance resulting from the short will appeal to the circuit 400 as the resistor 408 being coupled between the second node 412 and a ground terminal 414. In at least some examples, the first node 410 is configured to couple to a voltage supply, such as an output of the power management circuitry 242 and the second node is coupled to the node 220 (and therefore the VBUS terminal 222).

The switch 404 and the switch 406, in at least some examples, are controlled by the processing element 244 of the USB PD controller 210. For example, when the processing element 244 detects that the plug 226 has been inserted into the receptacle 224, prior to controlling the transistor 216 to couple the node 218 to the node 220, the processing element 244 controls the switch 404 and the switch 406 to close. When the switch 404 is closed, the current source 402 is coupled to the first node 410 and when the switch 406 is closed the current source 402 is coupled to the second node 412. When a short exists at the second node 412, current flows through the resistor 408 to the ground terminal 414, creating a voltage at the second node 412 approximately equal to the output of the current source 402 divided by a resistance of the resistor 408. When a short condition is not present at the second node 412 and the resistor 408 is not visible to the circuit 400, the voltage at the second node 412 is approximately equal to a voltage present at the first node 410. Additionally, in at least some examples in which a value of a signal present at the node 410 exceeds a predefined value, the switch 404 is opened, decoupling the current source 402 from the node 410 (e.g., such as when a high-voltage is present at the node 410 and the current source 402 is a low-voltage current source). In some examples in which a capability for isolating the current source 402 from the node 410 is not desired, the switch 404 is omitted from the circuit 400.

In at least some examples, the second node 412 is monitored by the processing element 244 to determine the voltage present at the second node 412, and in at least some examples thereby determining the resistance represented by the resistor 408. For example, an ADC of the processing element 244 has an input coupled to the second node 412 and a digital value representative of the output of the current source 402 is divided by an output of the ADC. When the resistance determined according to the voltage measured at the second node 412 is about 5.1 kiloohms, plus or minus a variation tolerance of about twenty percent, or is between about 800 ohms and about 1.2 kiloohms, the processing element 244 determines that a short circuit condition exists between the VBUS terminal 222 and the CC1 terminal 232 or between the VBUS terminal 222 and the CC2 terminal 234. Similarly, when the measured voltage is equal to about 1.1 V, the processing element 244 determines that a short circuit condition exists between the VBUS terminal 222 and the CC1 terminal 232 or between the VBUS terminal 222 and the CC2 terminal 234. When a short circuit condition exists, the USB PD controller 210 prevents coupling of the node 218 to the node 220, protecting the USB PD controller 210 from the determined short circuit condition. In at least some examples, after determining the resistance of the resistor 408, the switch 405 and the switch 406 are controlled to open, decoupling the current source 402 from the second node 412.

Figure 5:
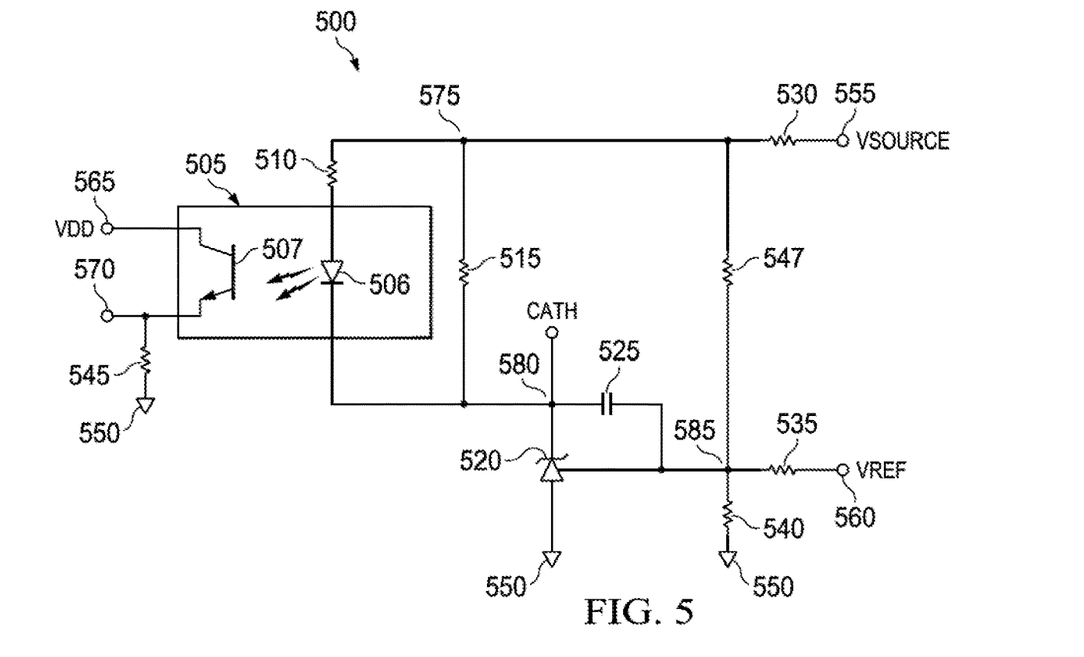
FIG. 5 shows a schematic diagram of an illustrative circuit in accordance with various examples.

Referring now to FIG. 5, a schematic diagram of a circuit 500 is shown. In at least one example, the circuit 500 is suitable for implementation as the voltage control circuit 212 of FIG. 2, and reference is made to elements of FIG. 2 in describing the circuit 500. In at least one example, the circuit 500 includes an optocoupler 505 (that includes a light emitting diode 506 and a photo-sensor 507), resistors 510, 515, 530, 535, 540, 545, and 547, a shunt regulator 520, and a capacitor 525. In some examples, at least some aspects of the circuit 500 are implemented in other devices. For example, at least some components of the circuit 500, when implemented as the voltage control circuit 212, may be implemented in the USB PD controller 210. Additionally, in various examples, at least some components of circuit 500 (e.g., the resistor 535) may be omitted or additional components not shown may be added to the circuit 500 to support the functionality described herein.

In at least one example architecture of circuit 500, the optocoupler 505 has a first terminal coupled to a node 565 and configured to receive a voltage VDD used in generating an output of a power supply, a second terminal coupled to node 570, a third terminal coupled to node 575 via resistor 510, and a fourth terminal coupled to node 580. The resistor 515 is coupled between node 575 and node 580. The shunt regulator 520 has a cathode coupled to node 580, an anode coupled to a ground voltage potential 550, and a control input coupled to node 585. The capacitor 525 is coupled between node 580 and node 585. The resistor 530 is coupled between node 555 and node 575, the resistor 535 is coupled between node 560 and node 585, the resistor 540 is coupled between node 585 and the ground voltage potential 550, the resistor 545 is coupled between node 570 and the ground voltage potential 550, and the resistor 547 is coupled between node 575 and node 585. In some examples, the circuit 500 is configured to receive a power supply output (VSOURCE) at node 555 (e.g., such that node 555 corresponds to node 218 of FIG. 2), receive VREF at node 560, receive CATH at node 580, and couple to a control input of the power supply (e.g., the power supply 208 of FIG. 2) at node 570.

In an example of operation of the circuit 500, the shunt regulator 520 converts a voltage present at node 585 to a proportional current that drives a brightness of the light emitting diode 506 of the optocoupler 505. The light emitted by the light emitting diode 506 is converted back to a proportional voltage by the photo-sensor 507, thereby approximately providing a proportional voltage at node 570 to the voltage present at node 585. When node 560 is floating, the resistor 547 and resistor 540 create a voltage divider that establishes a voltage present at node 585 as proportional to a voltage present at node 555. When current is sunk from node 560, the change in voltage at node 585 that is conveyed by the shunt regulator 520 and optocoupler 505 to node 570 causes a value of VSOURCE to change proportional to a value of the current sunk from node 560.

Figure 6:
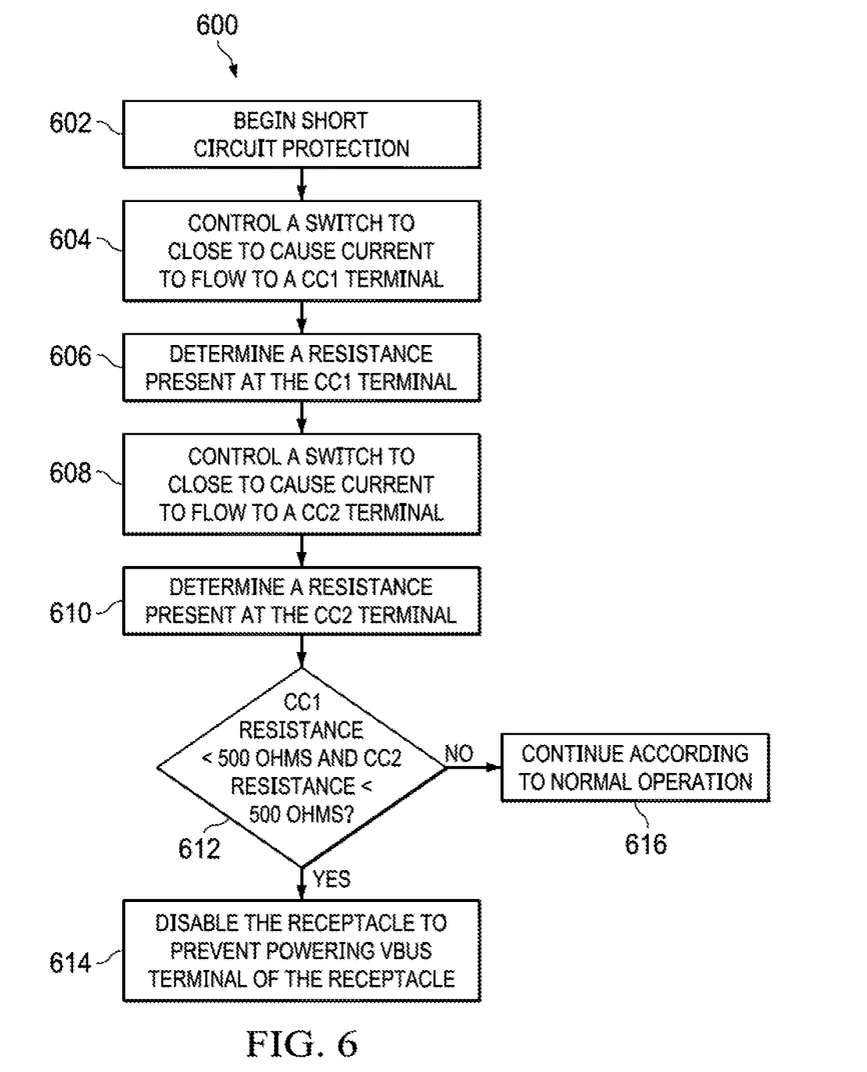
FIG. 6 shows a flowchart of an illustrative method in accordance with various examples.

Referring now to FIG. 6, a flowchart of an illustrative method 600 is shown. The method 600, in some examples, is a method for determining whether a short circuit condition exists at a terminal of a device. In one example, the terminal is a CC terminal of a USB-C receptacle or plug. Accordingly, in at least some examples the method 600 is suitable for implementation by a communication controller, such as the USB PD controller 210 of the system 200 of FIG. 2.

At operation 602, short circuit detection begins and the method 600 proceeds to operation 604. In some examples, the short detection begins when a plug is detected as being inserted into a receptacle. The plug is, for example, a USB-C plug and the receptacle is, for example, a USB-C receptacle having a VBUS terminal, a CC1 terminal, and a CC2 terminal. As a component of detecting insertion of the plug, an orientation of the plug is determined and/or a role (e.g., UFP or DFP) of the receptacle (when the receptacle is a part of a DRP) is determined. When the receptacle is a part of a DRP and the determined role based on the inserted plug is DFP, the short circuit detection begins. In another example, when the plug is not yet inserted into the receptacle, the DRP alternates between DFP and UFP roles, monitoring for insertion of a plug and subsequent determination of the DFP. In such examples, each time the DRP transitions from the UFP role to the DFP role, the short circuit detection begins and when the DRP transitions from the DFP role to the UFP role the short circuit detection ends. In yet another example, when the receptacle is a part of a DFP that does not have DRP capability, the short circuit detection remains in operation until a voltage present at the CC1 terminal reaches 2 V and/or until a voltage present at the CC2 terminal reaches 2 V.

At operation 604, the communication controller controls a switch to close to cause current to flow to a CC1 terminal of the receptacle. In some examples, such as when the CC1 terminal is operating under normal conditions and is not experiencing a short, the current flows from a constant current source through an about 500 ohm resistor coupled from the CC1 terminal to ground. When the CC1 terminal is experiencing a short circuit condition, the current flows through an alternative path to ground, where the alternative path has a resistance of less than the about 500 ohm resistor.

At operation 606, a resistance present at the CC1 terminal is determined. In at least some examples, the resistance is determined by the communication controller measuring a voltage present at the CC1 terminal and dividing a value of the current output by the constant current source at operation 604 by the measured voltage. In at least some examples, prior to performing the division, one or more of the value of the current output by the constant current source and/or the voltage present at the CC1 terminal are converted by an ADC from an analog domain to a digital domain. When the determined resistance is less than about 500 ohms, the communication controller determines the CC1 terminal to be experiencing a short circuit condition.

At operation 608, the communication controller controls a switch to close to cause current to flow to a CC2 terminal of the receptacle. In some examples, such as when the CC2 terminal is operating under normal conditions and is not experiencing a short, the current flows from a constant current source through an about 500 ohm resistor coupled from the CC2 terminal to ground. When the CC2 terminal is experiencing a short circuit condition, the current flows through an alternative path to ground, where the alternative path has a resistance of less than the about 500 ohm resistor. In some examples, the alternative path to ground associated with the CC1 terminal is the same alternative path to ground as is associated with the CC2 terminal when both the CC1 terminal and the CC2 terminal are experiencing the short circuit condition, while in other examples the alternative path to ground associated with the CC1 terminal is not the same alternative path to ground as is associated with the CC2 terminal.

At operation 610, a resistance present at the CC2 terminal is determined. In at least some examples, the resistance is determined by the communication controller measuring a voltage present at the CC2 terminal and dividing a value of the current output by the constant current source at operation 608 by the measured voltage. In at least some examples, prior to performing the division, one or more of the value of the current output by the constant current source and/or the voltage present at the CC2 terminal are converted by an ADC from an analog domain to a digital domain. When the determined resistance is less than about 500 ohms, the communication controller determines the CC2 terminal to be experiencing a short circuit condition.

At operation 612, the communication controller determines whether both the CC1 terminal and the CC2 terminal have been determined to be experiencing short circuit conditions (e.g., both determined resistances are less than about 500 ohms), at operation 614 the communication controller disables the receptacle such that communication is not commenced with a device coupled to the communication controller via the receptacle and the plug. In at least some examples, disabling the receptacle includes preventing application of a signal from a power supply to a VBUS terminal of the receptacle. When at least one of the CC1 terminal or the CC2 terminal is not experiencing a short circuit condition, at operation 616 the communication controller continues according to normal operation.

While the operations of the method 600 have been discussed and labeled with numerical reference, the method 600 may include additional operations that are not recited herein, any one or more of the operations recited herein may include one or more sub-operations, any one or more of the operations recited herein may be omitted, and/or any one or more of the operations recited herein may be performed in an order other than that presented herein (e.g., in a reverse order, substantially simultaneously, overlapping, etc.), all of which is intended to fall within the scope of the present disclosure.

Figure 7:
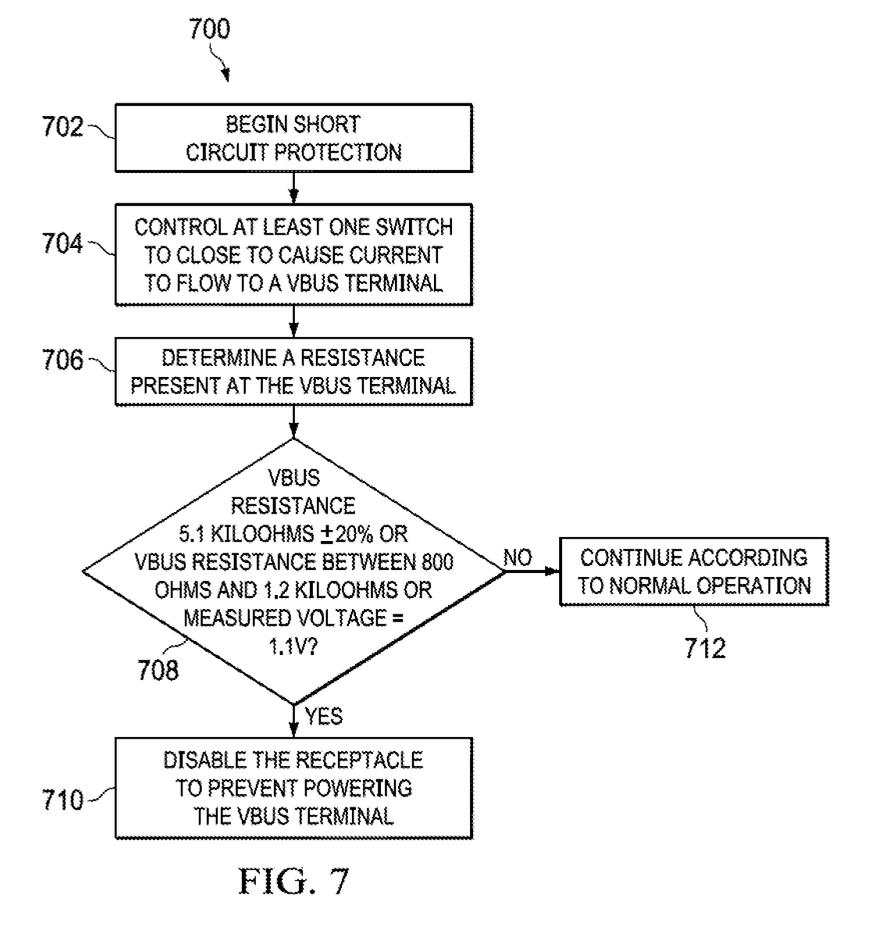
FIG. 7 shows a flowchart of an illustrative method in accordance with various examples.

Referring now to FIG. 7, a flowchart of an illustrative method 700 is shown. The method 700, in some examples, is a method for determining whether a short circuit condition exists at a terminal of a device. In one example, the terminal is a VBUS terminal of a USB-C receptacle or plug. Accordingly, in at least some examples the method 700 is suitable for implementation by a communication controller, such as the USB PD controller 210 of the system 200 of FIG. 2.

At operation 702, short circuit detection begins and the method 700 proceeds to operation 704. In some examples, the short detection begins when a plug is detected as being inserted into a receptacle. The plug is, for example, a USB-C plug and the receptacle is, for example, a USB-C receptacle having a VBUS terminal, a CC1 terminal, and a CC2 terminal. As a component of detecting insertion of the plug, an orientation of the plug is determined and/or a role (e.g., UFP or DFP) of the receptacle (when the receptacle is a part of a DRP) is determined. When the receptacle is a part of a DRP and the determined role based on the inserted plug is DFP, the short circuit detection begins. In another example, when the plug is not yet inserted into the receptacle, the DRP alternates between DFP and UFP roles, monitoring for insertion of a plug and subsequent determination of the DFP.

In such examples, each time the DRP transitions from the UFP role to the DFP role, the short circuit detection begins and when the DRP transitions from the DFP role to the UFP role the short circuit detection ends. In yet another example, when the receptacle is a part of a DFP that does not have DRP capability, the short circuit detection remains in operation at all times.

At operation 704, the communication controller controls at least one switch to close to cause current to flow to a VBUS terminal of the receptacle. In some examples, such as when the VBUS terminal is operating under normal conditions and is not experiencing a short, a constant current source generating the current flows pulls a value of the VBUS terminal up to about a value of a voltage supply of the constant current source. When the VBUS terminal is experiencing a short circuit condition, a resistance becomes visible at the VBUS terminal In at last some examples, the constant current source is applied to the VBUS terminal until a voltage present at the VBUS terminal reaches 2 V, after which it is determined that the VBUS terminal is not experiencing short circuit conditions and the constant current source is disabled.

At operation 706, a resistance present at the VBUS terminal is determined. In at least some examples, the resistance is determined by the communication controller measuring a voltage present at the VBUS terminal and dividing a value of the current output by the constant current source at operation 704 by the measured voltage. In at least some examples, prior to performing the division, one or more of the value of the current output by the constant current source and/or the voltage present at the VBUS terminal are converted by an ADC from an analog domain to a digital domain.

At operation 708, the communication controller determines whether the VBUS terminal is experiencing short circuit conditions. When the determined resistance is between about 800 ohms and about 1.2 kiloohms, or the determined resistance is equal to about 5.1 kiloohms plus or minus a variation of about twenty percent, the communication controller determines the VBUS terminal to be experiencing a short circuit condition to the CC1 terminal and/or the CC2 terminal. Similarly, when the measured voltage is equal to about 1.1 V, the communication controller determines the VBUS terminal to be experiencing a short circuit condition to the CC1 terminal and/or the CC2 terminal.

When the communication controller determines the VBUS terminal to be experiencing short circuit conditions, at operation 710 the communication controller disables the receptacle such that communication is not commenced with a device coupled to the communication controller via the receptacle and the plug. In at least some examples, disabling the receptacle includes preventing application of a signal from a power supply to the VBUS terminal. When the VBUS terminal is not experiencing a short circuit condition, at operation 712 the communication controller continues according to normal operation.

While the operations of the method 700 have been discussed and labeled with numerical reference, the method 700 may include additional operations that are not recited herein, any one or more of the operations recited herein may include one or more sub-operations, any one or more of the operations recited herein may be omitted, and/or any one or more of the operations recited herein may be performed in an order other than that presented herein (e.g., in a reverse order, substantially simultaneously, overlapping, etc.), all of which is intended to fall within the scope of the present disclosure.

Additionally, while described independently, in at least some examples the method 600 and the method 700 are complementary, such that the same communication controller may perform both the method 600 and the method 700. Additionally, operations of the method 600 and the method 700 may be arranged in any order, such that some operations of the method 700 are performed between operations of the method 600 or substantially concurrently with at least some operations of the method 600. In another example, a same communication controller executes the method 600, and when a short circuit condition is not detected, executes the method 700 prior to coupling the VBUS terminal 222 to a power supply (e.g., providing VBUS power at the VBUS terminal 222), thereby protecting the communication controller, receptacle, plug, and/or a device including the communication controller from damage and a degraded user experience.

Figure 8:
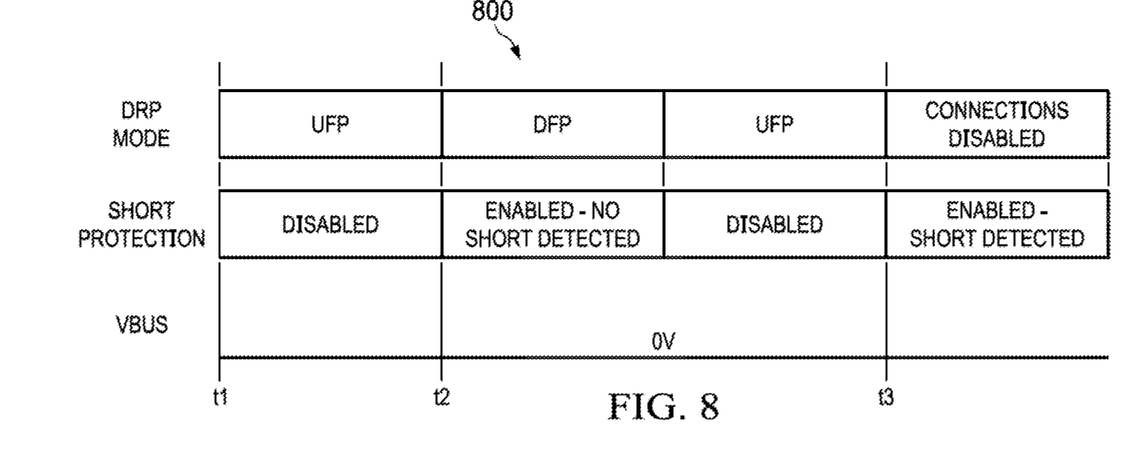
FIG. 8 shows an illustrative timing diagram in accordance with various examples.

Turning now to FIG. 8, an illustrative timing diagram 800 is shown. In at least some examples, the timing diagram 800 is illustrative of operation of the circuit 300 of FIG. 3 or circuit 400 of FIG. 4 and/or corresponds at least partially to the method 600 of FIG. 6 or the method 700 of FIG. 7, and reference may be made to elements of FIG. 3, FIG. 4, FIG. 6, and/or FIG. 7 in describing the timing diagram 800. As shown in the timing diagram 800, at a time t1 a DRP is operating in a UFP mode and short detection is disabled (e.g., the switches 306 and 308 or the switches 404 and/or 406 are controlled to be open). At a time t2, the DRP is operating in a DFP mode and short detection is enabled (e.g., the switches 306 and 308 or the switches 404 and/or 406 are closed) but no short is detected.

At a time t3, the DRP is again operating in the DFP mode and detects existence of a short. In some examples, the DFP operation is in the normal course of a DRP alternating between UFP and DFP modes of operation when no connection between a plug and receptacle is present, while in other examples operation in the DFP mode results from a plug being inserted into a receptacle and the DRP being controller to operate in the DFP mode based on determinations made responsive to insertion of the plug into the receptacle. Also at the time t4, connections of the receptacle are disabled. In various examples, disabling the connections includes preventing application of VBUS to a VBUS terminal of the receptacle and/or preventing application of a signal or voltage to a CC1 terminal and/or a CC2 terminal of the receptacle.

Figure 9:
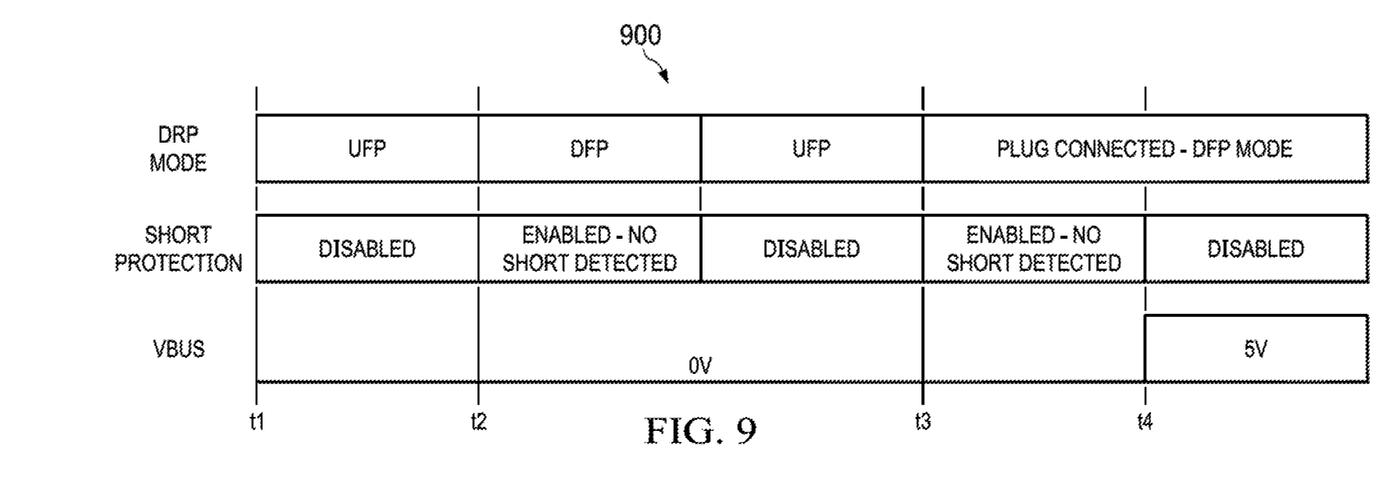
FIG. 9 shows an illustrative timing diagram in accordance with various examples.

Turning now to FIG. 9, an illustrative timing diagram 900 is shown. In at least some examples, the timing diagram 900 is illustrative of operation of the circuit 400 of FIG. 4 and/or corresponds at least partially to the method 700 of FIG. 7, and reference may be made to elements of FIG. 4 and/or FIG. 7 in describing the timing diagram 900. As shown in the timing diagram 900, at a time t1 a DRP is operating in a UFP mode and short detection is disabled (e.g., the switches 404 and/or 406 are controlled to be open). At a time t2, the DRP is operating in a DFP mode and short detection is enabled (e.g., the switches 404 and 406 are closed) but no short is detected.

At a time t3, a plug is inserted into a receptacle causing the DRP to operate in the DFP mode based on control of the DRP exerted according to determinations made responsive to insertion of the plug into the receptacle. At a time t4, it is determined that no short exists and short detection is disabled (e.g., the switches 404 and/or 406 are controlled to be open). Also at the time t4, VBUS is applied to a VBUS terminal of the receptacle. While illustrated as 5 V in FIG. 9, the value of VBUS may be any suitable value.

In the foregoing discussion, the terms "including" and "comprising" are used in an open-ended fashion, and thus should be interpreted to mean "including, but not limited to . . . " Also, the term "couple" or "couples" is intended to mean either an indirect or direct wired or wireless connection. Thus, if a first device, element, or component couples to a second device, element, or component, that coupling may be through a direct coupling or through an indirect coupling via other devices, elements, or components and connections. Similarly, a device, element, or component that is coupled between a first component or location and a second component or location may be through a direct connection or through an indirect connection via other devices, elements, or components and/or couplings. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

While certain components are described herein as being of a particular process technology (e.g., FET, metal-oxide FET (MOSFET), n-type, p-type, etc.), these components may be exchanged for components of other process technologies (e.g., replace FET and/or MOSFET with bi-polar junction transistor (BJT), replace n-type with p-type or vice versa, etc.) and reconfiguring circuits including the replaced components to provide desired functionality at least partially similar to functionality available prior to the component replacement. Additionally, uses of the phrase "ground voltage potential" in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means +/−20 percent of the stated value.

The above discussion is meant to be illustrative of the principles and various examples of the present disclosure. Numerous variations and modifications will become apparent to those skilled in the art once the above disclosure is fully appreciated. It is intended that the present disclosure be interpreted to embrace all such variations and modifications.

What is claimed is:

1. A circuit, comprising:
a first current source having first and second terminals;
a first switch having respective first and second terminals, its first terminal coupled to the second terminal of the first current source;
a first resistor coupled between the second terminal of the first switch and a ground terminal;
a second current source having respective first and second terminals, its first terminal coupled to the first terminal of the first current source;
a second switch having respective first and second terminals, its first terminal coupled to the second terminal of the second current source;
a second resistor coupled between the second terminal of the second switch and the ground terminal;
a third current source having respective first and second terminals, its first terminal coupled to the respective first terminals of the first and second current sources; and
a third switch having respective first and second terminals, its first terminal coupled to the second terminal of the third current source, and its second terminal coupled to the ground terminal.

2. The circuit of claim 1, including a fourth switch having respective first and second terminals, in which: its first terminal is coupled to the respective first terminals of the first and second current sources; and its second terminal is coupled to the first terminal of the third current source.

3. The circuit of claim 1, including a processing element, wherein the processing element is coupled to and configured to control the first switch, the second switch, and the third switch.

4. The circuit of claim 3, including power management circuitry, wherein the power management circuitry has a first input, a second input, and an output, the first input configured to couple to an output of a power supply, the second input coupled to an output of the processing element, and the output coupled to the respective first terminals of the first, second, and third current sources.

5. The circuit of claim 4, in which the power management circuitry comprises a power regulator having an input coupled to the output of the power supply and having an output coupled to the respective first terminals of the first, second, and third current sources and coupled to the second terminal of the third switch.

6. The circuit of claim 4, including:
the power supply; and
a transistor having a gate terminal coupled to a second output of the power management circuitry, a drain terminal coupled to the output of the power supply, and a source terminal coupled to the second terminal of the third switch,
the second terminal of the first switch and the first resistor are coupled to a configuration channel (CC)1 terminal of a receptacle,
the second terminal of the second switch and the second resistor are coupled to a CC2 terminal of the receptacle, and
the second terminal of the third switch is coupled to a bus voltage (VBUS) terminal of the receptacle.

7. The circuit of claim 1, including a receptacle configured to receive a reversable plug, the receptacle having: a configuration channel (CC)1 terminal is coupled to the second terminal of the first switch and to the first resistor; a CC2 terminal coupled to the second terminal of the second switch and to the second resistor; and a bus voltage (VBUS) terminal coupled to the second terminal of the third switch.

8. A circuit, comprising:
a configuration channel (CC) terminal short circuit protection circuit configured to:
close a first switch to apply a first constant current to a CC1 terminal coupled to a ground terminal via a first resistor to determine an amount of resistance present at the CC1 terminal;
close a second switch to apply a second constant current to a CC2 terminal coupled to the ground terminal via a second resistor to determine an amount of resistance present at the CC2 terminal; and
open the first switch and the second switch;
a bus voltage (VBUS) terminal short circuit protection circuit configured to:
close a third switch to apply a third constant current to a VBUS terminal coupled to the ground terminal to determine an amount of resistance present at the VBUS terminal; and
open the third switch; and
a processing element configured to:
control the first switch, the second switch, and the third switch to close after determining that a plug has been inserted into a receptacle that includes the CC1 terminal, the CC2 terminal, and the VBUS terminal;
measure a voltage present at the CC1 terminal to determine the amount of resistance present at the CC1 terminal;
measure a voltage present at the CC2 terminal to determine the amount of resistance present at the CC2 terminal;
measure a voltage present at the VBUS terminal to determine the amount of resistance present at the VBUS terminal;
control the first switch, the second switch, and the third switch to open; and
prevent application of a VBUS signal to the VBUS terminal when the determined amount of resistance present at the CC1 terminal and the determined amount of resistance present at the CC2 terminal, or the determined amount of resistance present at the VBUS terminal indicates that a short circuit condition exists.

9. The circuit of claim 8, in which the CC terminal short circuit protection circuit includes:
a first current source having first and second terminals, the first current source configured to output the first constant current at its second terminal;
the first switch, coupled between the second terminal of the first current source and the CC1 terminal;
the first resistor, coupled between the CC1 terminal and the ground terminal;
a second current source having respective first and second terminals, its first terminal coupled to the first terminal of the first current soruce, the second current source configured to output the second constant current at its second terminal;
the second switch, coupled between the second terminal of the second current source and the CC2 terminal; and
the second resistor, coupled between the CC2 terminal and the ground terminal.

10. The circuit of claim 9, in which the VBUS terminal short circuit protection circuit includes:
a third current source having respective first and second terminals, its first terminal coupled to the respective first terminals of the first and second current sources, the third current source configured to output the third constant current at its second terminal; and
the third switch, coupled between the second terminal of the third current source and the VBUS terminal.

11. The circuit of claim 9, including power management circuitry having a first input configured to couple to an output of a power supply, having a second input coupled to an output of the processing element, and having an output coupled to the respective first terminals of the first and second current sources.

12. The circuit of claim 11, including:
the power supply; and
a transistor having a gate terminal coupled to a second output of the power management circuitry, having a drain terminal coupled to the output of the power supply, and having a source terminal coupled to the VBUS terminal.

13. The circuit of claim 12, in which the processing element is configured to prevent application of a VBUS signal to the VBUS terminal when the short circuit condition exists by controlling the power management circuitry to maintain the transistor in a non-conductive state, electrically decoupling the output of the power supply from the VBUS terminal.

14. The circuit of claim 9, in which the first resistor has a first resistance value and the second resistor has a second resistance value, and wherein the processing element is configured to determine that the short circuit condition exists when the determined amount of resistance present at the CC1 terminal is less than the first resistance value and the determined amount of resistance present at the CC2 terminal is less than the second resistance value.

15. A system, comprising:
a processor;
a communication port having a configuration channel (CC1) terminal, a second configuration channel (CC2) terminal, and a bus voltage (VBUS) terminal; and
a communication controller configured to facilitate communication by the processor via the communication port, wherein the communication controller includes:
a first current source having first and second terminals;
a first switch coupled between the second terminal of the first current source and the CC1 terminal;
a first resistor coupled between the CC1 terminal and a ground terminal;
a second current source having respective first and second terminals, its first terminal coupled to the first terminal of the first current source;
a second switch coupled between the second terminal of the second current source and the CC2 terminal;
a second resistor coupled between the CC2 terminal and the ground terminal;
a third current source having respective first and second terminals, its first terminal coupled to the respective first terminals of the first and second current source;
a third switch coupled between the second terminal of the third current source and the ground terminal and coupled to the VBUS terminal; and
a processing element coupled to and configured to control the first switch, the second switch, and the third switch.

16. The system of claim 15, in which the communication controller is configured to determine whether a short circuit condition exists at the VBUS terminal or at the CC1 terminal and the CC2 terminal after detecting that a plug has been inserted into the communication port.

17. The system of claim 15, including power management circuitry, the power management circuitry has a first input configured to couple to an output of a power supply, a second input coupled to an output of the processing element, and an output coupled to the first node, and the power management circuitry includes a power regulator having an input coupled to the output of the power supply and an output coupled to the respective first terminals of the first, second, and third current sources.

18. The system of claim 17, including:
   the power supply; and
   a transistor having a gate terminal coupled to a second output of the power management circuitry, having a drain terminal coupled to the output of the power supply, and having a source terminal coupled to the VBUS terminal.

19. The system of claim 18, in which the communication controller prevents application of a VBUS signal to the VBUS terminal when a short circuit condition exists by controlling the power management circuitry to maintain the transistor in a non-conductive state, electrically decoupling the output of the power supply from the VBUS terminal.

20. The system of claim 15, in which the processing element is further configured to:
   control the first switch, the second switch, and the third switch to close after determining that a plug has been inserted into the communication port;
   measure a voltage present at the CC1 terminal to determine an amount of resistance present at the CC1 terminal;
   measure a voltage present at the CC2 terminal to determine an amount of resistance present at the CC2 terminal;
   measure a voltage present at the VBUS terminal to determine an amount of resistance present at the VBUS terminal;
   control the first switch, the second switch, and the third switch to open; and
   prevent application of a VBUS signal to the VBUS terminal when the determined amount of resistance present at the CC1 terminal and the determined amount of resistance present at the CC2 terminal, or the determined amount of resistance present at the VBUS terminal, indicates that a short circuit condition exists.

* * * * *